United States Patent
Yamaoka

(10) Patent No.: US 8,651,950 B2
(45) Date of Patent: Feb. 18, 2014

(54) GAMING DEVICE AND RECORDING MEDIUM

(75) Inventor: Masatoshi Yamaoka, Sakai (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/351,735

(22) Filed: Jan. 17, 2012

(65) Prior Publication Data

US 2012/0184368 A1    Jul. 19, 2012

(30) Foreign Application Priority Data

Jan. 19, 2011    (JP) .................................. 2011-008730

(51) Int. Cl.
*A63F 13/04*    (2006.01)

(52) U.S. Cl.
USPC ................................. 463/31; 463/37; 345/173

(58) Field of Classification Search
USPC .................. 463/4, 30–34, 3, 36–38; 345/173; 348/14.03
See application file for complete search history.

(56) References Cited

U.S. PATENT DOCUMENTS

| | | | |
|---|---|---|---|
| 2005/0176502 A1* | 8/2005 | Nishimura et al. | 463/31 |
| 2007/0155455 A1* | 7/2007 | Fujioka et al. | 463/3 |
| 2008/0146328 A1 | 6/2008 | Ishii et al. | |
| 2009/0137296 A1 | 5/2009 | Takahashi et al. | |
| 2010/0222143 A1* | 9/2010 | Endo | 463/30 |

FOREIGN PATENT DOCUMENTS

| | | |
|---|---|---|
| JP | 2006-181286 | 7/2006 |
| JP | 2006-314763 | 11/2006 |
| JP | 2006-325885 | 12/2006 |
| JP | 2007-215757 | 8/2007 |
| JP | 2008-148860 | 7/2008 |
| JP | 2008-245985 | 10/2008 |

OTHER PUBLICATIONS

Machine Translation of Japanese Application 2008-245985 to Nagahama et al, Konami Digital Entertainment, Oct. 16, 2008.*

* cited by examiner

*Primary Examiner* — Damon Pierce
(74) *Attorney, Agent, or Firm* — Jordan and Hamburg LLP

(57) ABSTRACT

The invention includes a group information storing unit for storing a relationship between characters and a plurality of groups formed by dividing the characters according to roles these characters play in a game, and a character moving unit for specifying, when a pointing means is brought into contact with one of sensed areas on an image display unit to be associated with one of the groups, a characters in the group associated with the sensed area that is touched, according to information stored in the group information storing unit, and for moving the specified characters simultaneously in a direction associated with the sensed area that is touched, by an amount corresponding to a predetermined distance.

7 Claims, 16 Drawing Sheets

FIG.11

| SENSED AREA | GROUP OF BASEBALL PLAYER CHARACTERS MOVED | MOVEMENT DIRECTION |
|---|---|---|
| A1 | OUTFIELDERS GROUP (C1~C3) | UP |
| A2 | DITTO | DOWN |
| A3 | DITTO | LEFT |
| A4 | DITTO | RIGHT |
| A5 | INFIELDERS GROUP (C4~C7) | UP |
| A6 | DITTO | DOWN |
| A7 | DITTO | LEFT |
| A8 | DITTO | RIGHT |
| A9 | ALL FIELDERS GROUP (C1~C7) | UP |
| A10 | DITTO | DOWN |

GAMING DEVICE AND RECORDING MEDIUM

BACKGROUND OF THE INVENTION

1. Field of the Invention

The present invention relates to a technique for establishing a game environment in virtual space by bringing pointing means into contact with an image display unit that is a touch-input type display. More specifically, the present invention relates to a system on which a player can change initial positions of characters or objects arranged in the game.

2. Description of the Related Art

Some conventional baseball games are known to allow a game player to change fielding positions of baseball player characters of a defensive team. In real baseball games, when a power hitter stands in the batter's box, outfielders may play deeper than normal in order not to let the batted ball fly over them. In some virtual games, such flexible fielding has been achieved. For example, Japanese Patent Application Laid-Open No. 2008-245985 explains a configuration in which, with areas, in which respective fielders' fielding ranges are made changeable, being preset with respect to sets of fielding positions, which are formed by dividing the entire fielding area into these sets, the player can move each character from the default position within the range in an amount one block at a time (see FIGS. 5 and 6).

However, in the method of changing the fielding positions as disclosed in the aforementioned Japanese Patent Application Laid-Open No. 2008-245985, it is necessary to move the baseball player characters individually for their respective positions. For example, even when the game player wants to move two or more characters together, e.g., to move outfielders deeper or to move infielders closer to the home plate, the fielders should be moved one by one, which is often bothersome for the player.

Besides, when the game player uses a portable device, such as a cellular phone or a smartphone with a relatively small and narrow display screen, it is not easy for the game player to move individual characters with his or her finger.

On the other hand, some conventional games provide choices for several typical positionings (e.g., outfield deep, outfield in, infield deep, infield in, and bunt position). This allows the game player to choose one of them.

These types of design only make it possible to choose just one positioning pattern from the predetermined plurality of patterns. Thus the game player cannot precisely adjust the positions of the individual characters, although he or she may want to move the outfielders a bit deeper or move the outfielders much deeper. Like this, the conventional games are not enough to achieve such precise positioning according to what the game player actually wants to do.

SUMMARY OF THE INVENTION

An object of the present invention is to provide a gaming device of the type that can respond to areas being touched, and a recording medium on which a game control program is recorded, wherein fielding positions of baseball player characters can be changed with simple operations of a game player.

The gaming device according to an aspect of the present invention is a gaming device on which a game is played in virtual space by bringing pointing means into contact with an image display unit that is a touch-input type display, the gaming device comprising: an initial fielding position storing unit for storing an initial fielding position of each object appearing in the game; a changeable area storing unit for storing a changeable area for each object within which the initial fielding position for the object can be renewed; a group information storing unit for storing a relationship between each of the objects and a group to which each of the objects belongs; an object moving unit for specifying, when the pointing means is brought into contact with one of sensed areas provided on the display unit, the objects in a group associated with the sensed area that is touched, according to information stored on the group information storing unit, and moving the specified objects simultaneously in a direction associated with the sensed area that is touched, by an amount corresponding to a predetermined distance; and an object position storing unit for storing the positions of the objects moved by the object moving unit.

In addition, a recording medium according to another aspect of the present invention is a computer readable recording medium on which a game control program is recorded, the game control program a game to be played in a virtual space by bringing pointing means into contact with an image display unit that is a touch-input type display, the game control program causing a computer to function as: an initial fielding position storing unit for storing an initial fielding position of each object appearing in the game; a changeable area storing unit for storing a changeable area for each object within which the initial fielding position for the object can be renewed; a group information storing unit for storing a relationship between each of the objects and a group to which each of the objects belongs; an object moving unit for specifying, when the pointing means is brought into contact with one of sensed areas provided on the display unit, the objects in a group associated with the sensed area that is touched, according to information stored on the group information storing unit, and moving the specified objects simultaneously in a direction associated with the sensed area that is touched, by an amount corresponding to a predetermined distance; and an object position storing unit for storing the positions of the objects moved by the object moving unit.

BRIEF DESCRIPTION OF THE DRAWINGS

FIG. 11 is a view showing relationships among the sensed areas in FIG. 10, fielder characters moved, and their movement directions;

DETAILED DESCRIPTION OF THE PREFERRED EMBODIMENTS

The invention is now described, by way of example, with reference to the accompanying drawings.

[Configuration of Gaming Device]

Figure 1:
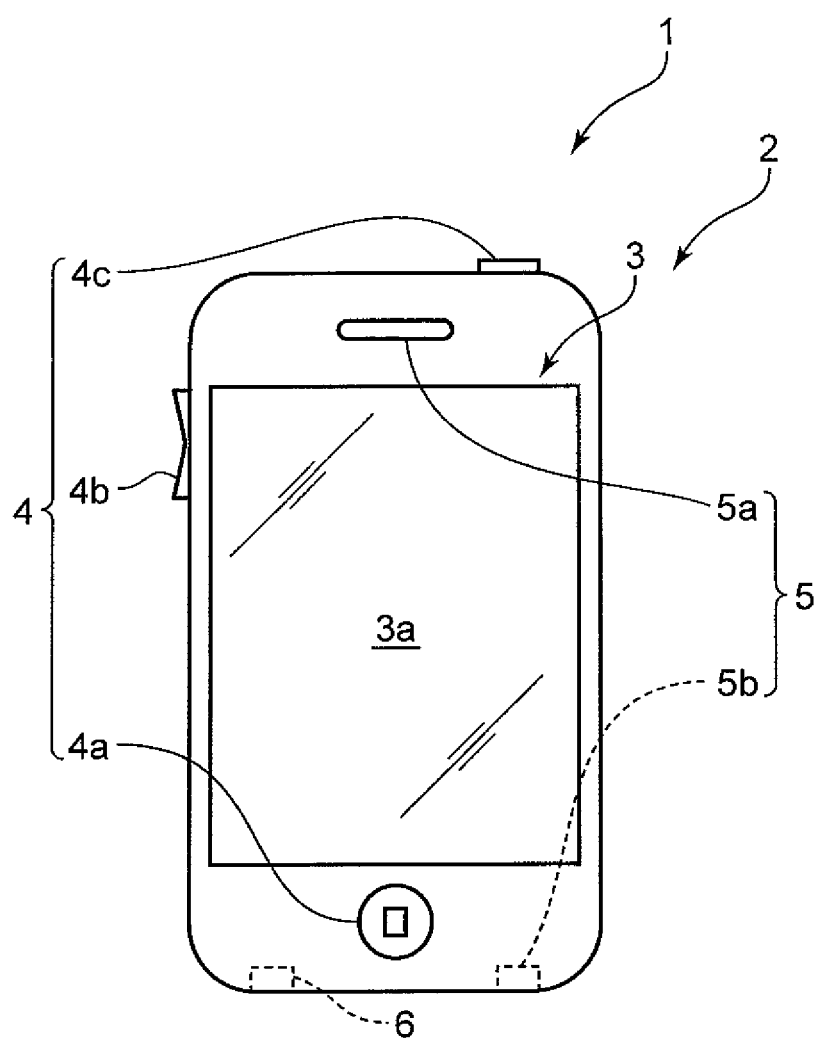
FIG. 1 is a view showing a portable game console according to one embodiment of the present invention.
Figure 2:
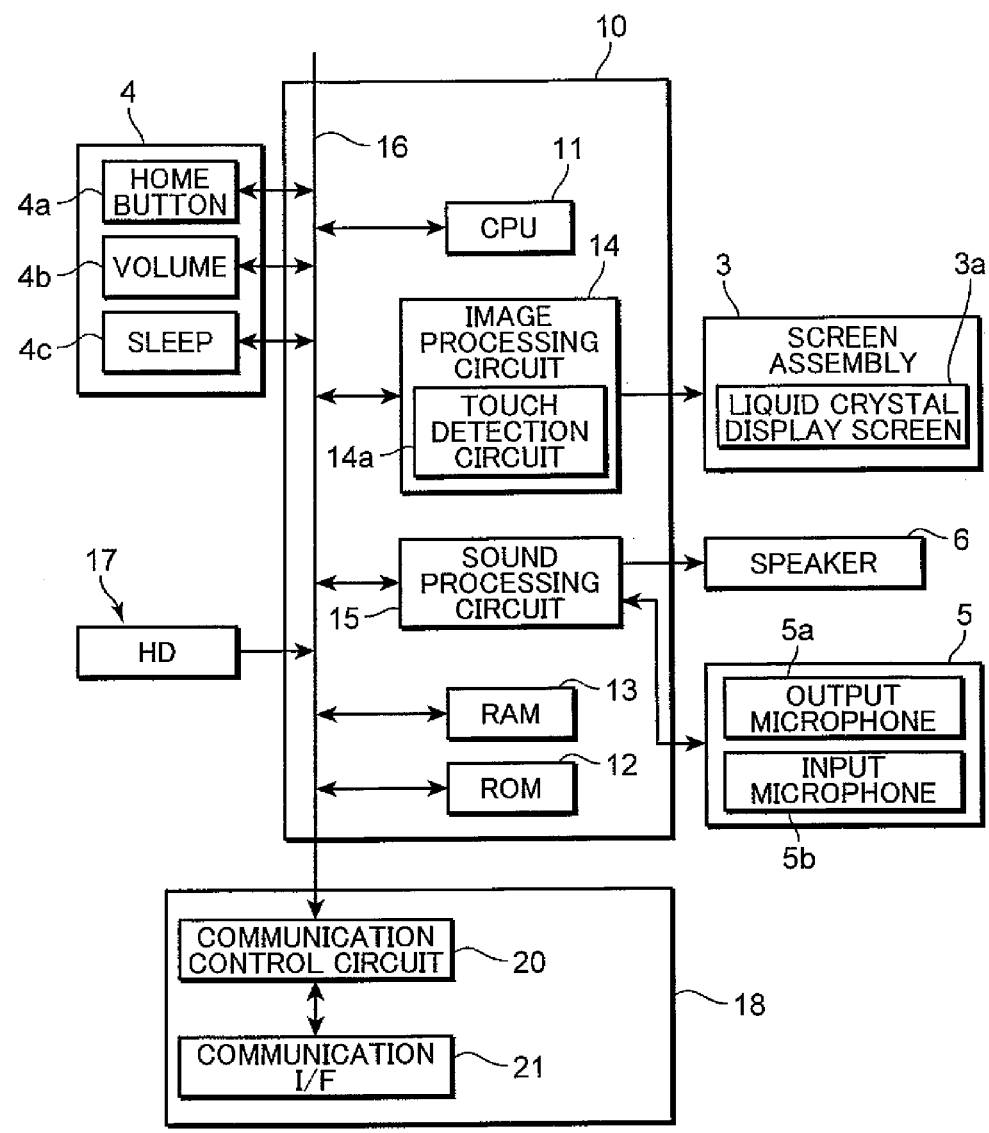
FIG. 2 is a view showing a hardware configuration of the portable game console in FIG. 1.

FIG. 1 is an external view of a portable game console 1 which exemplifies a computer to which a gaming device according to the present invention can be applied. FIG. 2 is a control block diagram as an example of the portable game console 1.

As shown in FIG. 1, the portable game console 1 mainly comprises a main body 2, a screen assembly 3, an operating portion 4, a microphone 5, and a speaker 6. The screen assembly 3 is mounted on the main body 2 and has a liquid crystal display screen 3a. The liquid crystal display screen 3a herein is a capacitive touch screen. The liquid crystal display screen 3a has a touch panel and an LCD unit, both of which are not shown. In this liquid crystal display screen 3a, an electric field is formed across the entire surface of the touch panel. Touching the screen with pointing means such as a finger or a conductive stylus changes the amount of charge at a point of contact. This change is measured to determine the physical location on the touch screen that a user touched with his/her finger or a stylus. The touch screen used herein is a projected capacitive touch screen, which enables detection of contact at multiple points.

The operating portion 4 has a home button 4a, a volume button 4b, and a sleep button 4c. The home button 4a is located below the touch screen on the main body 2. When the user touches the home button 4a, Home screen is displayed or the portable game console 1 is woken up when it's asleep. The volume button 4b is located on the upper side of the main body 2. Pressing the upper part of the volume button 4b increases the volume level. Pressing the lower part of the volume button 4b decreases the volume level. The sleep button 4c is located on the top of the main body 2. Pressing the sleep button 4c switches the portable game console 1 to sleep mode.

The microphone 5 has an output microphone 5a and an input microphone 5b. The output microphone 5a is located above the touch screen on the main body 2. Sound comes out through the output microphone 5a when the user plays game, makes or receives a phone call, or listens to music. The input microphone 5b is built in the main body 2. The main body 2 has a receptacle for the microphone in the bottom surface thereof. Sound is transmitted through input microphone 5b when the user makes a phone call or records sound.

The speaker 6 is built in the main body 2. The main body 2 has a speaker hole in the bottom surface thereof. Sound comes out through the speaker 6 when the user plays game or listens to music or recorded sounds. It should be noted that the portable game console 1 has an earphone jack and some other components, but description thereof is omitted here.

Referring to FIG. 2, the portable game console 1 includes therein a control unit or a controller 10, a storage device 17, and a communication unit 18. The controller 10 has a central processing unit (CPU) 11 which is based on a microprocessor, a read only memory (ROM) 12 which serves as main storage device, a random access memory (RAM) 13, an image processing circuit 14, and a sound processing circuit 15. They are connected to each other via a bus 16.

The CPU 11 fetches instructions of a game program and performs various data processing and controls. The ROM 12 stores programs essential for the basic operation (e.g., startup) of the portable game console 1. The RAM 13 serves as a temporary workspace for the CPU 11. The image processing circuit 14 controls the screen assembly 3 according to a drawing instruction from the CPU 11 to display a predetermined image on the liquid crystal display screen 3a. In addition, the image processing circuit 14 has a touch detection circuit 14a. When the user touches the screen with the pointing means such as a finger, a touch signal is supplied from the touch detection circuit 14a to the CPU 11. The CPU 11 can thus determine the point of contact. In addition, when the user touches an object displayed on the screen with the pointing means, a signal for selecting that object is supplied from the touch detection circuit 14a to the CPU 11. The CPU 11 can thus determine that the object is selected.

The sound processing circuit 15 generates an analog audio signal according to a sound production command from the CPU 11 to send it to the output microphone 5a and/or the speaker 6. In addition, the sound processing circuit 15 converts an analog audio signal into a digital audio signal when sound is transmitted through the input microphone 5b.

The communication unit 18 has communication functions for data exchange during a game and for cell phone calls. The communication function for the data exchange includes a function over a local wireless network and a function for Internet connection via wireless LAN.

The communication unit 18 has a communication control circuit 20 and a communication interface 21. The communication control circuit 20 and the communication interface 21 are connected to the CPU 11 via the bus 16. The communication control circuit 20 and the communication interface 21 control and issue a connection signal for use in connecting the portable game console 1 to the Internet via a local wireless network or a wireless LAN, in response to a command from the CPU 11. In addition, in response to the command from the CPU 11, the communication control circuit 20 and the communication interface 21 control and issue a connection signal for use in connecting the portable game console 1 via a telephone line.

The storage device 17 is built in the main body 2 and is connected to the bus 16. For example, the storage device 17 may be a hard disk or a flash memory drive as a recording medium. It should be noted that there may be an interface circuit or circuits (not shown) between each of the aforementioned components and the bus 16, if necessary.

In the portable game console 1 having the aforementioned configuration, a game player (hereinafter, referred to as a "player") can enjoy playing different kinds of game on the screen assembly 3 when a game program stored on the storage device 17 is loaded and the loaded game program is executed by the CPU 11. In addition, the player can exchange data with other game console(s) or play competitive game by means of connecting the portable game console 1 to other game console(s) via a wireless network or a communication cable, through the communication control circuit 20.

The game to be played on the portable game console 1 may be, for example, a baseball game. A game program for playing the baseball game is stored on a storage device which is not shown. When the player starts playing the baseball game, this game program is loaded on the RAM 13 and executed. In this baseball game, instructions can be made by touching the liquid crystal display screen 3$a$ with pointing means such as a finger.

[Positioning for Fielding Positions in Baseball Game to which the Present Invention is Applied]

Figure 3:
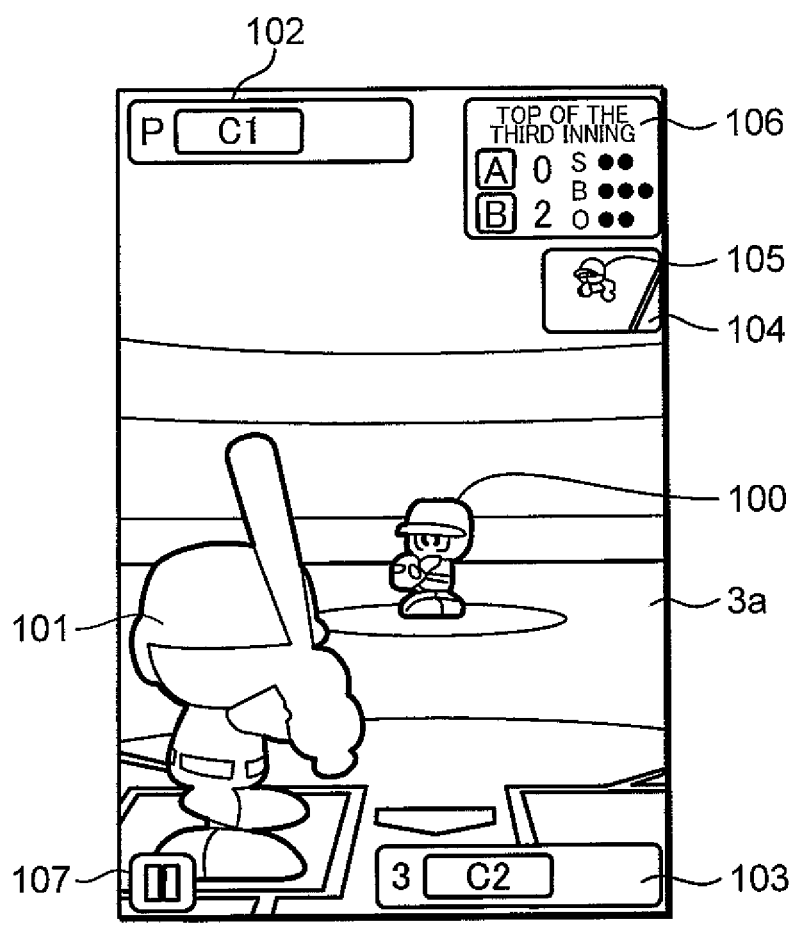
FIG. 3 is a view showing a game screen image according to one embodiment of the present invention.
Figure 4:
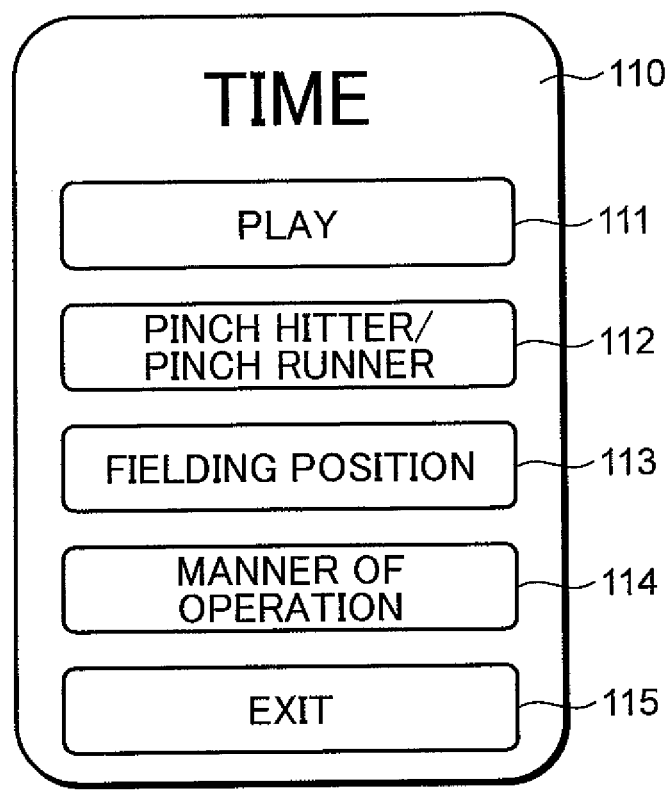
FIG. 4 is a view showing a pause state (time-out screen image) of a game, the screen image of which is shown in FIG. 3.
Figure 14:
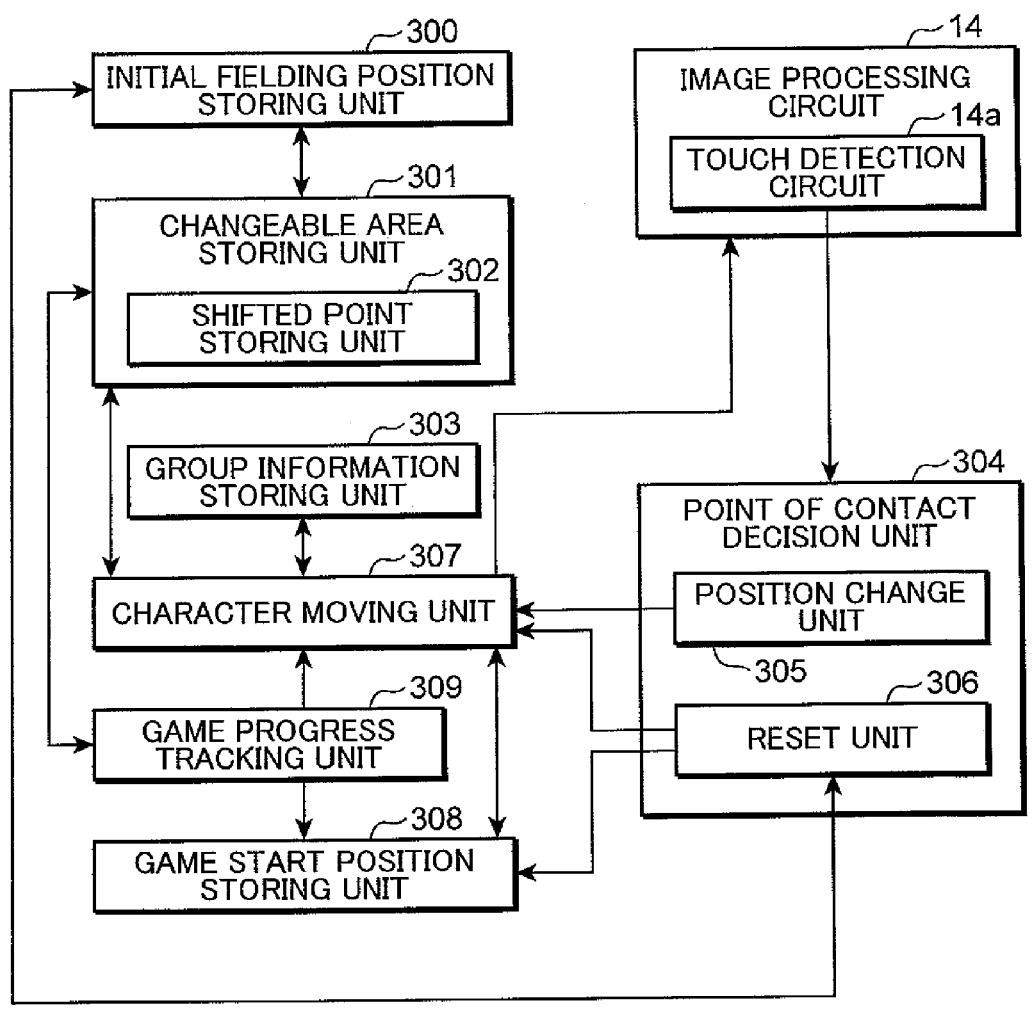
FIG. 14 is a block diagram illustrating major functions of a gaming device according to one embodiment of the present invention.

FIG. 3 is a view showing an example of a screen image displayed on a touch screen of, for example, a smartphone. The screen image shown in FIG. 3 is the initial screen image of an embodiment in which the present invention is applied to the positioning for the fielding positions in a baseball game. FIG. 4 is a view showing a screen image for a halt (time-out) in the baseball game shown in FIG. 3. FIGS. 5 and 6 to 9B are views showing screen images to be displayed in response to an operation after the halt in FIG. 4. FIG. 14 is a functional block diagram illustrating major functions of the present invention, which corresponds to a part of the controller 10 in FIG. 2. Now, referring to the drawings, this embodiment of the present invention is described. It should be noted that, in the following embodiment, it is assumed that the player is in the defensive team.

FIG. 3 shows the screen image before a pitcher character 100 makes a pitching motion to deliver the ball to the batter character 101. Boxes represented by the reference numerals 102 and 103 are for the names of the pitcher and batter characters, respectively. In this example, the pitcher's name is indicated as C1 while the batter's name is indicated as C2. The figure depicted on the left side of the box 103 indicates a uniform number of the batter character 101. In addition, this screen image includes a runner window 104 which is displayed when there is a runner on a base. In this case, the runner window 104 indicates that there is a runner 105 on first base. Although not illustrated in the figure, a different runner window is displayed at the center and the left of the screen for a second base runner and a third base runner, respectively. Moreover, a scoreboard 106 is provided on which reports each team's total scores and other information such as the number of outs, balls, and strikes on the batter. A time-out button 107 is displayed on the lower left corner of the screen. The time-out button 107 is used to pause or temporarily stop the game. More specifically, the time-out button 107 is used to temporarily stop the game as shown in FIG. 3, in order to get a pinch hitter or a pinch runner in the game when the player is in the offensive team or to change positions of the fielders when the player is in the defensive team. Touching the time-out button 107 shifts the view to a time-out screen image.

FIG. 4 is a time-out screen image 110 that is displayed when the game is temporarily stopped. As shown in FIG. 4, the time-out screen image 110 has a "PLAY" button 111, a "PINCH HITTER/PINCH RUNNER" button 112, a "FIELDING POSITION" button 113, a "MANNER OF OPERATION" button 114, and a "EXIT" button 115. The "PLAY" button 111 is used to restart the game. For example, after a predetermined operation is done with other button or buttons, touching the "PLAY" button 111 on the time-out screen image 110 will return the player to the last game screen image. The "PINCH HITTER/PINCH RUNNER" button 112 is for using a pinch hitter or a pinch miner. Touching this button shifts the view to a screen on which candidate pinch hitters/pinch runners are listed (details not described). The "FIELDING POSITION" button 113 is a feature of the present invention. When the player wants to change a position of a certain fielder, he or she can shift the view to a fielding position change screen as described below, by touching this button. The "MANNER OF OPERATION" button 114 is used to display information about controls of the buttons and operations to play the game. With the "EXIT" button 115, the player can exit the game in the meantime. The information associated with the game progress before shifting to the time-out screen image 110 is stored on the RAM 13. The game information stored on the RAM 13 is read when the player restarts the game. Touching the "FIELDING POSITION" button 114 shifts the view from the time-out screen image in FIG. 4 to a fielding positioning screen image in FIG. 5.

Figure 5:
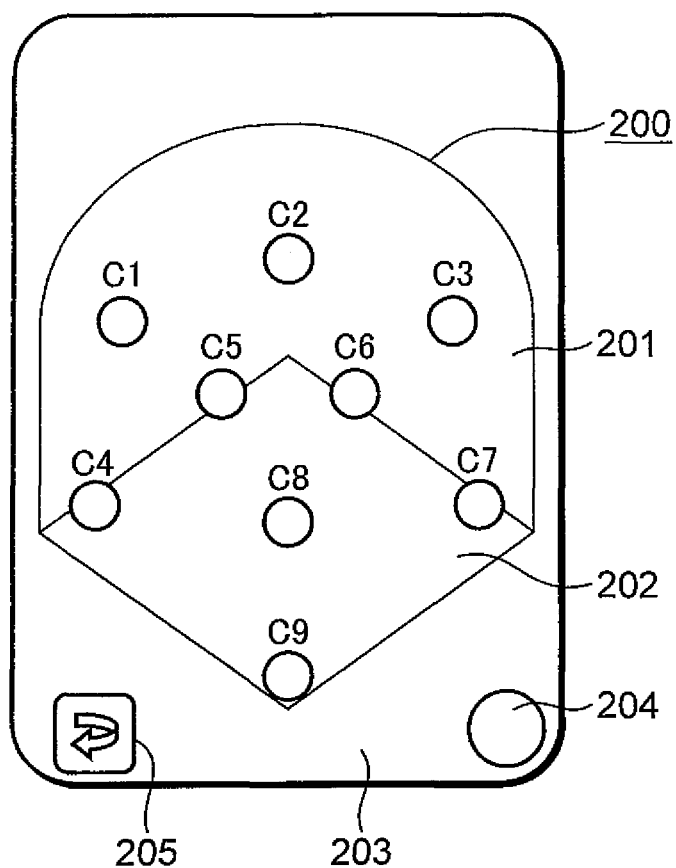
FIG. 5 is a view showing a fielding positioning screen image according to one embodiment of the present invention.

FIG. 5 shows a baseball field 200 of a baseball game displayed on the liquid crystal display screen 3$a$. The baseball field 200 is made up of an outfield 201 and an infield 202. The area outside the outfield 201 and the infield 202 is referred to as an out-of-the-field area 203. In addition, baseball player characters C1 to C9 of a defensive team are also displayed. More specifically, C1 represents a left fielder, C2 represents a center fielder, C3 represents a right fielder, C4 represents a third baseman, C5 represents a shortstop, C6 represents a second baseman, C7 represents a first baseman, C8 represents a pitcher, and C9 represents a catcher. In this configuration, the aforementioned baseball player characters are divided into three groups to allow the player to change initial fielding positions of these characters as described below. These three groups are: an outfielders group (C1, C2, and C3), an infielders group (C4, C5, C6, and C7), and an all fielders group (C1 to C7). The pitcher character C8 and the catcher character C9 are not included in these groups. In the figure, the reference numeral 204 depicts a reset button with which the player can reset the fielding positions, and the reference numeral 205 depicts a BACK button to return to the time-out screen image.

Figure 6A:
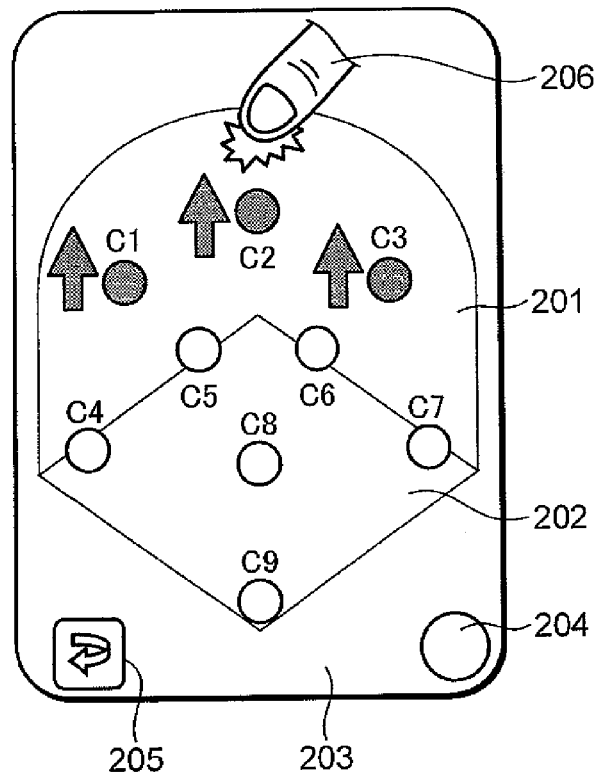
FIGS. 6A and 6B are views illustrating how the game unfolds in next stages.
Figure 6B:
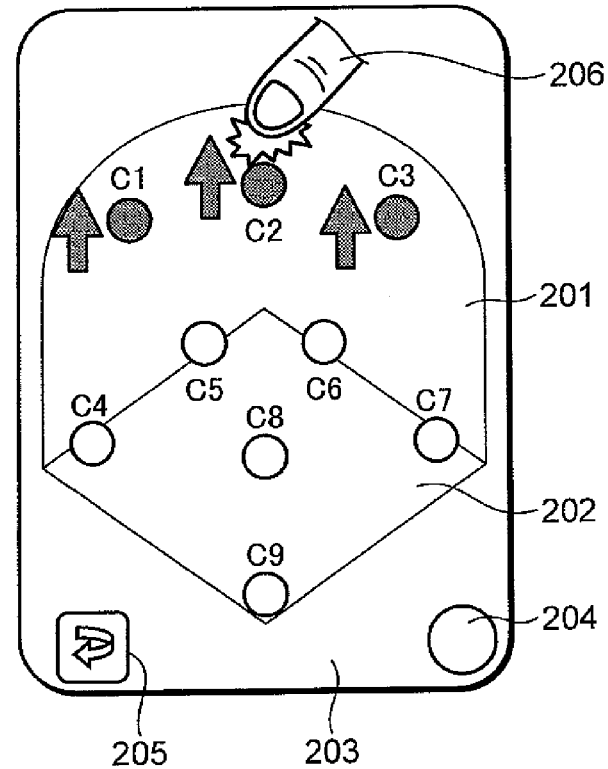

FIGS. 6A and 6B are views illustrating that the player moves the outfielder characters in a step-by-step manner deeper. As shown in FIG. 6A, when the player touches once an upper part of the outfield 201 (corresponding to a sensed area, details of which are described below) with his or her finger 206 (corresponding to the pointing means), only the three outfielder characters C1, C2, and C3 move up (deeper) simultaneously by a predetermined distance. The predetermined distance that each outfielder character moves is determined according to the position (role) of these character. The remaining characters C4 to C9 do not move and stay their respective fixed positions. Next, as shown in FIG. 6B, when the player again touches once an upper part of the outfield 201 with his or her finger 206, only the three outfielder characters C1, C2, and C3 further move up (deeper) simultaneously by the same predetermined distance as above. Although not illustrated in detail, the outfielder characters are moved in a similar manner every time when the player touches the subject area on the screen. However, there is an upper limit of the number of times that the outfielder characters can move, as described below. The upper limit is equal to five in this embodiment, and no character is moved even when six or more touches are made.

Figure 7A:
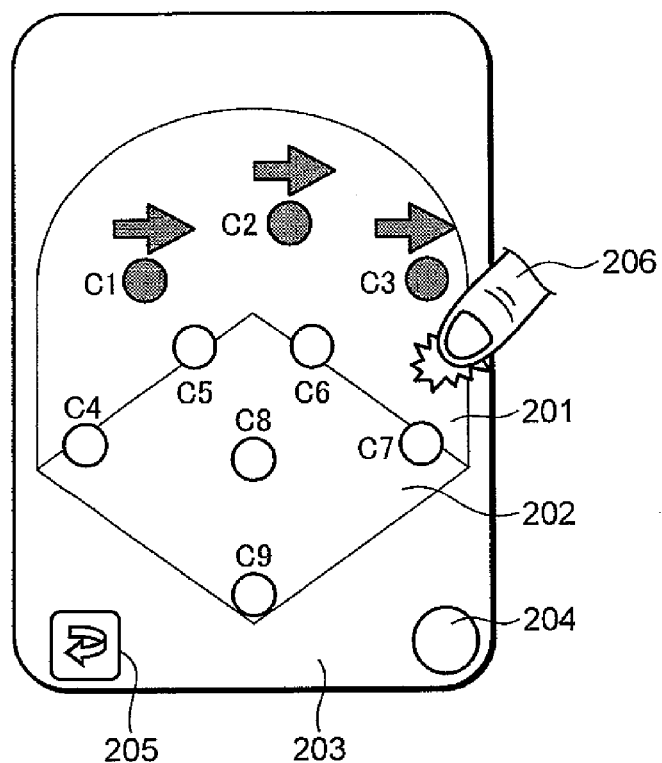
FIGS. 7A and 7B are views illustrating how the game unfolds in next stages, respectively.
Figure 7B:
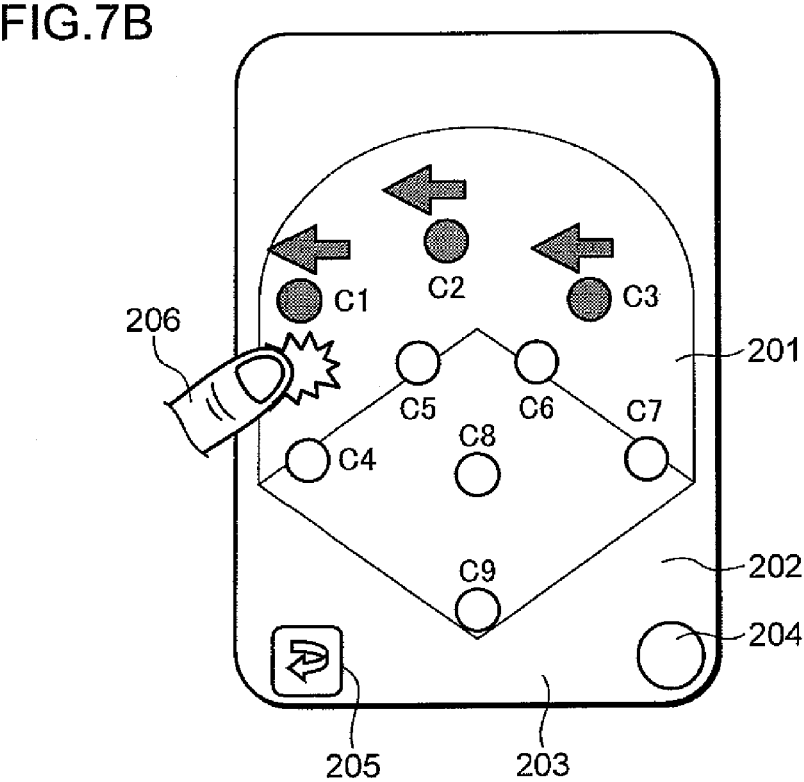

FIGS. 7A and 7B are views illustrating that the player moves the outfielder characters right and left, respectively. As shown in FIG. 7A, when the player touches once a right part of the outfield 201 (on the right field side, corresponding to the sensed area) with his or her finger 206 (corresponding to the pointing means), only the three outfielder characters C1, C2, and C3 move right (horizontally toward the right field fence) simultaneously by a predetermined distance specified for them. In addition, as shown in FIG. 7B, when the player touches once a left part (on the left field side, corresponding to the sensed area) of the outfield 201 with his or her finger 206, only the three outfielder characters C1, C2, and C3 move left (horizontally toward the left field fence) simultaneously by the predetermined distance specified for them. Every time when the player touches the target area in the outfield 201, the outfielder characters are moved by the predetermined distance in both FIGS. 7A and 7B.

Figure 8A:
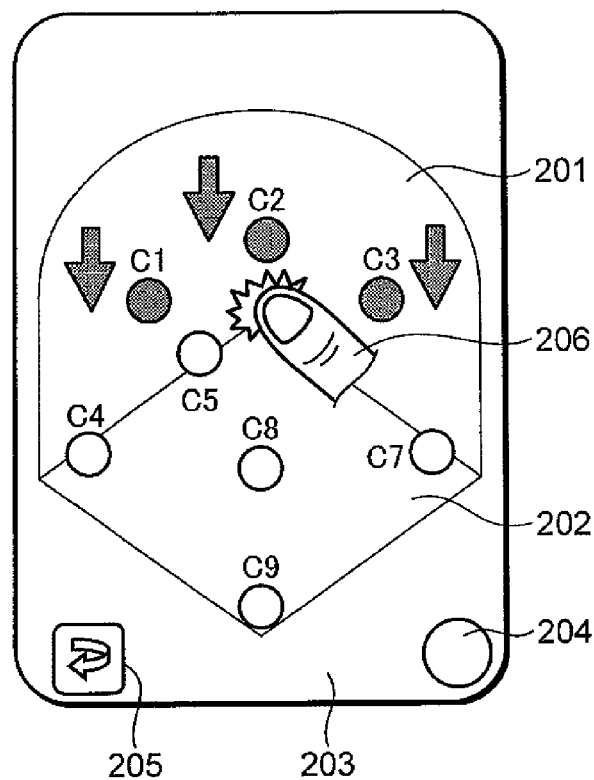
FIG. 8A is a view illustrating how the game unfolds in next stages.
Figure 8B:
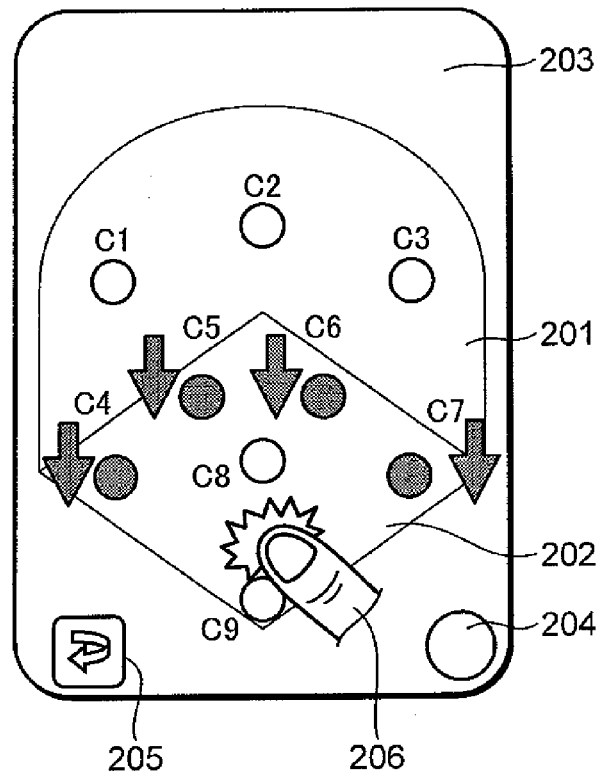
FIG. 8B is a view illustrating how the game unfolds in next stages.

FIGS. 8A and 8B are views illustrating that the player moves the outfielder characters and the infielder characters, respectively in a downward direction (toward the batter). As shown in FIG. 8A, when the player touches once a lower part of the outfield 201 (close to the second baseman field, corresponding to the sensed area) with his or her finger 206, only the three outfielder characters C1, C2, and C3 move down (toward the second baseman field) simultaneously by a predetermined distance specified for them. In addition, as shown in FIG. 8B, when the player touches once a lower part of the infield 202 (close to the batter box, corresponding to the sensed area) with his or her finger 206, only the four infielder characters C4, C5, C6, and C7 move down (toward the batter) simultaneously by a predetermined distance specified for them.

Figure 9A:
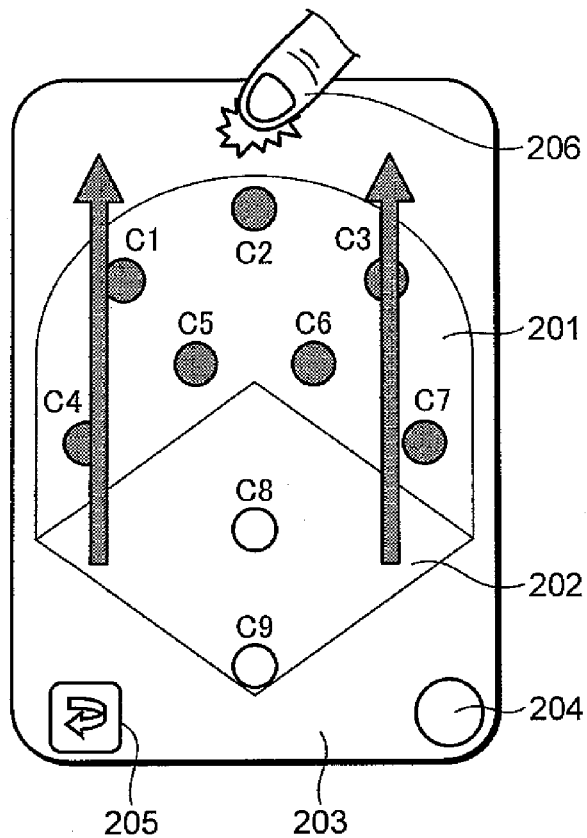
FIG. 9A is a view illustrating how to move the outfielder and infielder characters together deeper into a field.
Figure 9B:
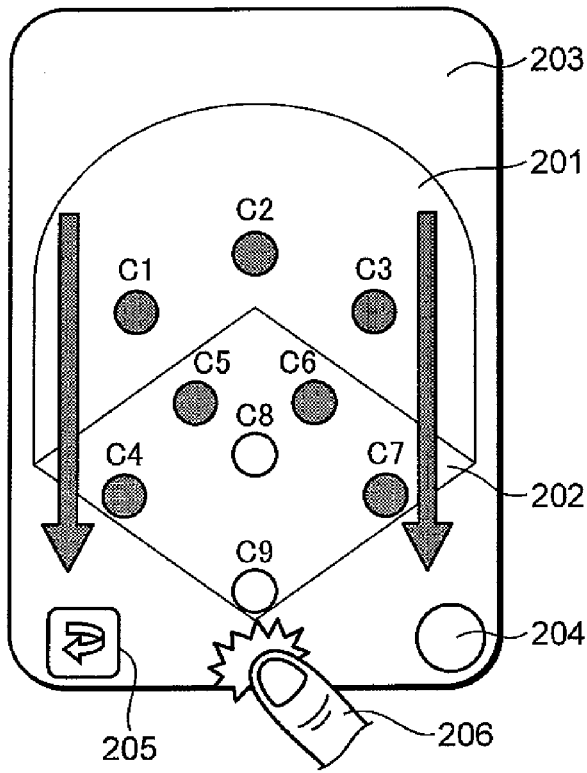
FIG. 9B is a view illustrating how to move the outfielder and infielder characters together in the direction close to the batter.

FIGS. 9A and 9B are views illustrating that the player can move all characters except for the pitcher and the catcher (i.e., the outfielders and the infielders) in the upward (deeper) direction and the downward (shallower) direction, respectively. As shown in FIG. 9A, when the player touches once an upper part of the out-of-the-field area 203 (corresponding to the sensed area) with his or her finger 206, all fielder characters C1 to C7 move up simultaneously by the predetermined distance specified for them. In addition, as shown in FIG. 9B, when the player touches once a lower part of the out-of-the-field area 203 (corresponding to the sensed area) with his or her finger 206, all fielder characters C1 to C7 move down simultaneously by the predetermined distance specified for them.

While not described further, similar rules apply to the directions not described above. As described below in conjunction with FIG. 10, the outfield 201 and the infield 202 have their respective sensed areas near the upper, lower, right, and left edges thereof. The out-of-the-field area 203 have its sensed areas near the upper and lower edges thereof. When the player touches one of the sensed areas, only the baseball player characters associated with that sensed area move in a direction corresponding to the relative position of the sensed area. This allows the player to easily and intuitively understand the relationship between the sensed areas and the directions of the character movement, providing an easy-to-use feature of the game console. Moreover, it is unnecessary to touch each character directly with a finger to move it. Thus, there is no possibility that the character is hidden by the finger.

While the characters described in conjunction with FIGS. 5 to 9B are moved only in one direction at a time, the player can adjust the fielding positions in various manners. For example, the player may touch a given sensed area three times to move the characters in a certain direction and then may move them in the opposite direction with a single touch. Alternatively, the player may move the outfielder characters deeper into the field by touching the upper part of the outfield three times and then move the infielder characters deep by touching the upper part of the infield once. If the player fails to do appropriate positioning for the fielding positions or is confused, the reset button 204 is used to return the outfielder and infielder characters to their default fielding positions. In FIGS. 5 to 9B, the player touches one of the upper, lower, right, and left sensed areas with his or her finger 206 to move only the associated group (one of the infielders group, the outfielders group, and the all fielders group) of characters at the same time. The sensed areas for such movement are all determined previously.

Figure 10:
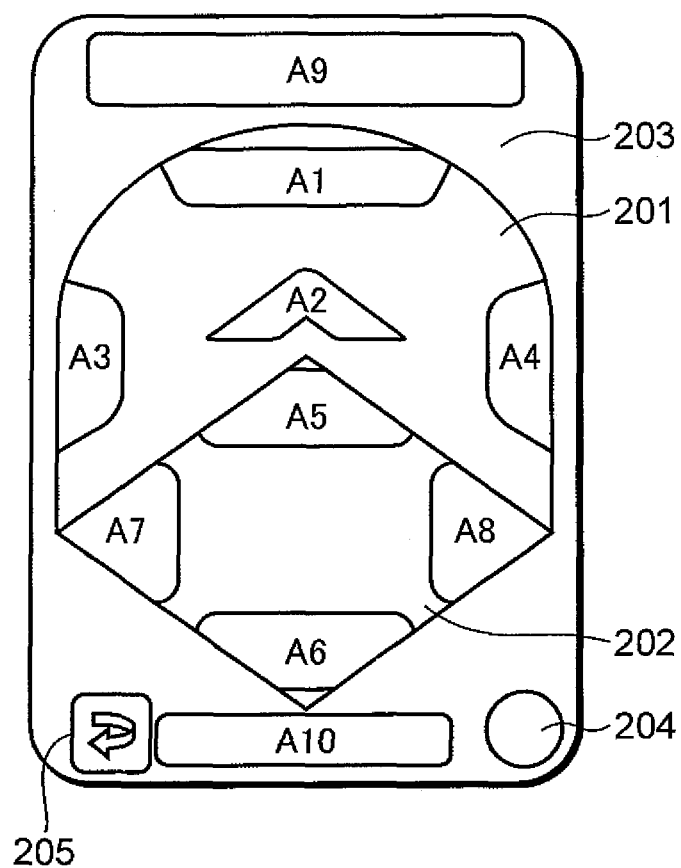
FIG. 10 is a view showing sensed areas on a touch screen for use in achieving positioning for fielding positions according to one embodiment of the present invention.

FIG. 10 shows the aforementioned sensed areas. These sensed areas are previously assigned for each of the outfield, the infield, and the out-of-the-field area. The outfield 201 has the sensed areas A1, A2, A3, and A4. As shown, no sensed area is provided along the paths to the left-center and the right-center locations of the outfield (blank areas in the figure). This is because the fielder characters in this embodiment are allowed to move only in the four directions: up, down, right, and left, as described below in conjunction with FIGS. 12 and 13A to 13C. More specifically, when the console determines that the player touches the sensed area A1 with his or her finger 206, all outfielder characters move up. When the console determines that the player touches the sensed area A2 with his or her finger 206, all outfielder characters move down. When the console determines that the player touches the sensed area A3 with his or her finger 206, all outfielder characters move left. When the console determines that the player touches the sensed area A4 with his or her finger 206, all outfielder characters move right. When the player touches the diagonal blank areas in the outfield with his or her finger, no character is moved. This clarifies the relationship between the sensed areas and the directions in which the characters move, allowing the player to play the game more easily. Moreover, these sensed areas are spaced apart from each other in order to prevent the finger of the player from touching two sensed areas at once. If touch is detected at two or more sensed areas, this touch is ignored.

Similar to the outfield 201, the infield 202 has the sensed areas A5, A6, A7, and A8 at upper, lower, left, and right corners thereof, as shown in FIG. 10. The out-of-the-field area 203 has the sensed areas A9 and A10 at the upper and lower ends, respectively, thereof.

FIG. 11 shows a table indicating the relationship among the aforementioned sensed areas A1 to A10, the groups of the baseball player characters to be moved when the player touches either sensed area, and the directions of movement. As described above in conjunction with FIGS. 5 to 9B, a single touch by the player with his or her finger results in the movement of the associated characters by a predetermined distance. This is described with reference to FIG. 12.

Figure 12:
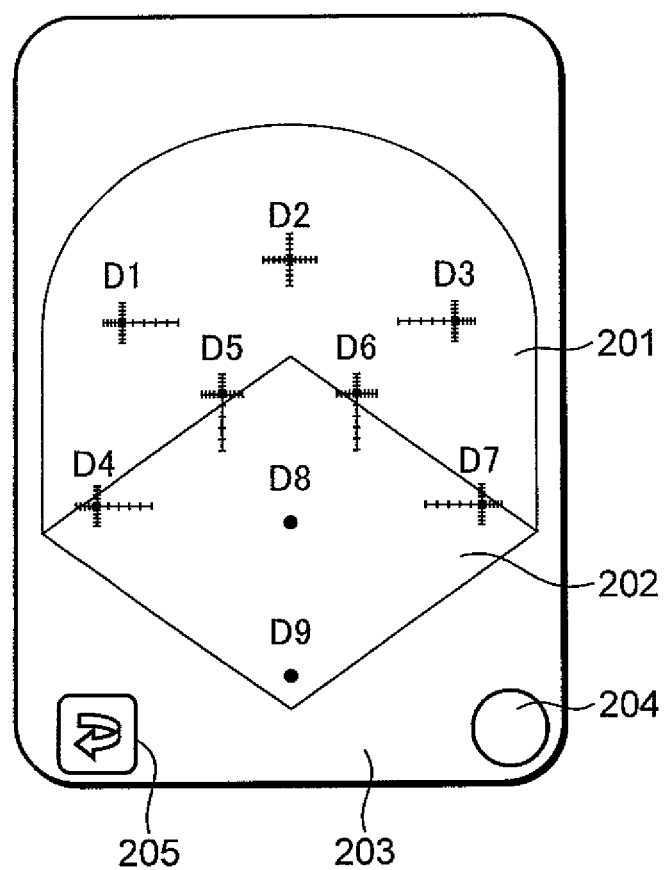
FIG. 12 is a view illustrating character positionable spans according to one embodiment of the present invention.

FIG. 12 is a view showing a range of movement (changeable area) for each fielder character from its initial position. The ranges of movement for the left, center, and right outfielders are depicted by D1, D2, and D3, respectively. The center of the cross corresponds to the default initial fielding position of the character. The character can be moved in four directions (up, down, left, right) from the center over the range of movement. Each limb of the cross is divided into five equal intervals at points (corresponding to target points). Touching the sensed area once moves the characters by an amount equal to one interval. The limbs of the cross and thus the individual intervals have different lengths from position to position, reflecting the difference in size of the position coverage of the fielders. This is described in detail below by using enlarged views.

Figure 13A:
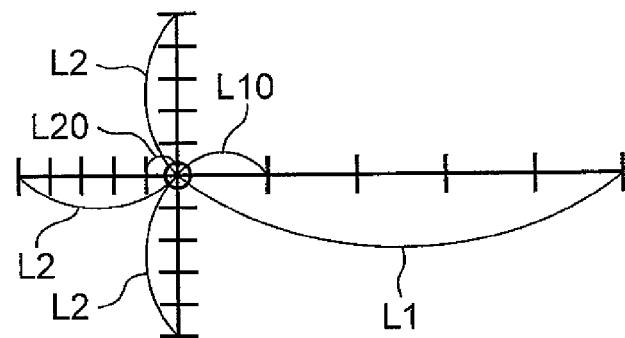
FIG. 13 is a view showing details of the character positionable spans in FIG. 12.
Figure 13B:
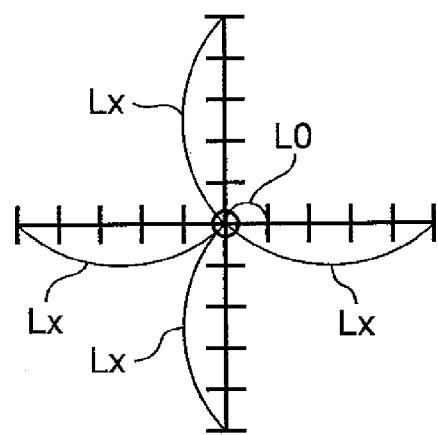
Figure 13C:
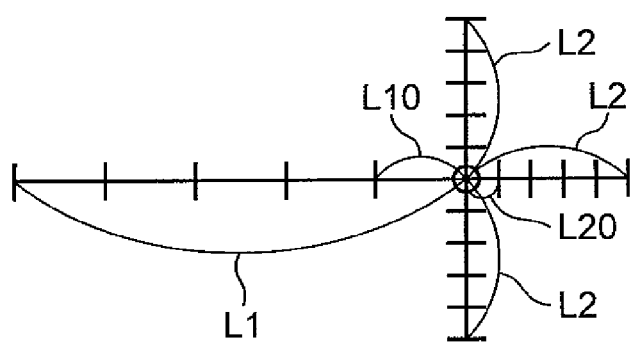

FIGS. 13A to 13C are enlarged views showing the ranges of movement D1, D2, and D3 in FIG. 12. As shown in FIG. 13A, the range of movement D1 for the left fielder is defined by line segments L1 and L2. The line segment L1 extends in the direction to the center fielder and is longer than the remaining three line segments L2. This means that the left fielder can move a longer distance in this direction than in other directions when the player intends to change the position of it. An interval L10 corresponds to a distance that the left fielder can move in the right direction toward the center position in response to a single touch on the screen by the player. The interval L10 is larger than an interval L20 in the three other directions. This difference in length of the intervals is merely an example, and various modifications can be made depending on each scenario of the game. Alternatively, different teams may have different patterns of ranges of movement. In addition, as shown in FIG. 13B, the range of movement D2 for the center fielder is defined by four line segments of the same length. Furthermore, as shown in FIG. 13C, the range of movement D3 for the right fielder has a shape obtained by horizontally flipping the range of movement D1 for the left fielder. While the ranges of movement D1 to D3 are described herein, the same applies to other ranges of movement D4, D5, D6, and D7 and detailed description thereof is omitted.

Referring back to FIG. 12, the ranges of movement D4, D5, D6, and D7 are for the initial fielding positions of the third baseman, the shortstop, the second baseman, and the first baseman, respectively. The positions D8 and D9 are for the pitcher and the catcher, respectively, and are fixed. As apparent from FIG. 12, the size and the dimensions of the ranges of movement D1 to D7 are separately specified for individual positions. This means that the characters may move through different distances from each other in response to a touch of the screen by the player. Thus, even through the player can move the multiple characters at a time, this does not produce a uniform pattern of movement of the characters. The positioning of the characters can be made appropriately for the respective fielding positions.

While the positions of the fielder characters in the aforementioned embodiment are adjusted every time when the player touches either sensed area with his or her finger 206, the characters may be moved according to the length of time that the player is touching the screen. For example, a certain amount of distance may be assigned to one second of contact. If the player keeps touching the screen for three seconds, the characters may be moved by an amount that is three times the unit distance. Alternatively, the ranges of movement D4, D6, and D7 of the ranges of movement D1 to D7 may be modified in position and dimensions when there is a runner on a base that each infielder covers. This is because infielders do not shift as far to reach the base as the runner does in real baseball games. This configuration provides more realistic game experiments with more appropriate fielding positions. Specifically, when a power hitter stands in the batter's box with a second runner on base, and player wants to move the fielders deeper, farther from the batter than normal, he or she shifts the game screen image in FIG. 3 to the fielding positioning screen image in FIG. 5 via the time-out screen image in FIG. 4. In such a case, the range of movement D6 for the second baseman covering the second base is defined at a position closer to the second base than normal (i.e., when no runner is on). In addition, the four line segments are defined to be shorter than normal (i.e., when no runner is on).

This procedure is described with reference to a functional block diagram in FIG. 14. This is a functional block diagram illustrating major functions of the present invention and corresponds to a part of the controller 10 in FIG. 2. The example given in FIGS. 6A and 6B is used here for the purpose of description. The configuration according to this embodiment has an initial fielding position storing unit 300 on which default (initial) positions of the characters are stored. In addition, a changeable area storing unit 301 is also provided that stores the changeable area for each character within which the initial fielding position for the character can be renewed. The changeable area storing unit 301 includes a shifted point storing unit 302. The shifted point storing unit 302 stores the ranges of movement for the characters as described in conjunction with FIG. 10, as well as the shifted points for each range of movement. The changeable area storing unit 301 and the shifted point storing unit 302 stores different kinds of data for a case where no runner is on base and a case where a runner or runners is/are on base. The data for the latter case can be data for C4 (third baseman), C6 (second baseman), and C7 (first baseman) included in the infielders group. When a runner is on base, the range of movement for the infielder covering that base is narrower and closer to the base than the range of movement used when no runner is on. Information about whether or not there is a runner and which base the runner is on is stored in a game progress tracking unit 309 described below.

Moreover, a group information storing unit 303 stores the groups of the fielder characters to be moved when the player touches one of the sensed areas A1 to A10, as well as the directions of their movement. The group as used herein refers to a collection made according to roles of fielders in a game scenario. More specifically, the groups are: the outfielders group (C1, C2, and C3), the infielders group (C4, C5, C6, and C7), and the all fielders group (C1 to C7) as described in conjunction with FIG. 11. In this embodiment, when the player wants to shift the outfielder characters at their default positions in FIG. 5 back (deep) into the outfield, the player touches an upper part of the outfield 201 with his or her finger 206. Then, a point of contact decision unit 304 determines the area including the point of contact on the liquid crystal display screen 3a, according to coordinates of the point of finger contact detected by the touch detection circuit 14a. More specifically, the point of contact decision unit 304 includes a position change unit 305 that stores the coordinates of the sensed areas A1 to A10 shown in FIG. 10. The point of contact decision unit 304 determines the area including the point of contact using the information in the position change unit 305. The point of contact decision unit 304 includes a reset unit 306 which resets the positions of the fielder characters to their initial fielding positions. This is described later.

When it is determined that two or more areas are touched at the same time, the point of contact decision unit 304 considers that no contact is made. Such a decision suggests that the player actually touches two or more sensed areas, e.g., the sensed area A2 at the lower part of the outfield and the sensed area A5 at the upper part of the infield, at the same time with his or her finger(s). If the fielder characters are moved in such a situation where the player's intent is unclear, the result may be different from the one that the player wants to have. Thus, the point of contact decision unit 304 dare not to move the fielder characters in order to let the player touch the sensed area again.

When the point of contact decision unit 304 determines the sensed area which the player touches with his or her finger 206 (the sensed area A1 in this example), a character moving unit 307 supplies a signal to simultaneously move up (deep) all outfielders as described above in conjunction with FIG. 6A to the image processing circuit 14. The image processing circuit 14 displays the motion of the characters on the liquid crystal display screen 3a of the screen assembly 3. (Hereinafter, description is mainly made about signal exchanges among the blocks and display on the liquid crystal display screen 3a is not described, but the motion of each character is displayed according to a signal supplied from the character moving unit 307). Destinations of the character movement are defined according to the data stored in the shifted point storing unit 302 of the changeable area storing unit 301, with the default initial fielding position of each character used as a starting point. The shifted point storing unit 302 stores the coordinates of the points to which the associated character can be moved (FIG. 12). While the outfielders move simultaneously but the distance that the character moves may differ from character to character. The position (coordinates) of the moved character is stored on a game start position storing unit (an example of position storing unit) 308.

The position is stored on the game start position storing unit 308 whenever the character moves. Accordingly, the character moving unit 307 recognizes the latest position stored on the game start position storing unit 308 every time when the player touches one of the sensed areas, and moves the corresponding character from that latest position. Before starting the movement, the game start position storing unit 308 stores the default positions of the characters. Thus, the character moving unit 307 always refers to the information stored on the game start position storing unit 308 in order to determine the position of given characters. The extremities of the movement are stored on the shifted point storing unit 302. The character moving unit 307 does not move any character that has already reached either extremity even when movement is directed in the direction from the center to that extremity.

The game progress tracking unit 309 stores whether or not there is a runner and which base the runner is on is stored, according to information supplied by the CUP 11 (FIG. 2). For example, in response to information supplied from the CPU 11 indicating that a runner took first base, the game progress tracking unit 309 retrieves the data corresponding to the case where a runner is on first base, from the changeable area storing unit 301 and the shifted point storing unit 302. The game progress tracking unit 309 then sends a command to the character moving unit 307 in order to move the first baseman to a position closer to the first base. At the same time, the game progress tracking unit 309 stores the position after being changed for the first baseman on the game start position storing unit 308. The game start position storing unit 308 stores the latest position as well as the character positionable span and the target points for the first baseman when there is a runner on first base. Thus, these data are applied when the player changes the fielding positions of the characters. More specifically, the range of movement for that character covering the base is narrower and closer to the base than the range of movement used when no runner is on. When the first runner gets on second, the game progress tracking unit 309 changes the data about the position and the range of movement for the second baseman into those for the case where there is a runner on second base, in a manner similar to the one as described above, according to the information supplied from the CPU 11. In addition, the game progress tracking unit 309 returns the data about the position and the range of movement for the first baseman to those used immediately before the runner gets on the first base.

The player may move the characters in various patterns. For example, the player may touch a given sensed area three times to move the characters in a certain direction and then may move them in the opposite direction with a single touch. Alternatively, the player may move the outfielder characters deeper into the field by touching the upper part of the outfield three times and then move the infielder characters deep by touching the upper part of the infield once. If the player fails to do appropriate positioning for the fielding positions or is confused during the adjustment, he or she can use the reset button 204. If the reset button 204 is used, the input is detected by the touch detection circuit 14a which sends a signal to the reset unit 306. In response to this, the reset unit 306 acquires position information about the initial (default) positions of all characters from the initial fielding position storing unit 300 and sends a command to initialize the character positions to the character moving unit 307. Furthermore, the reset unit 306 updates the positions of the characters stored on the game start position storing unit 308.

Figure 15:
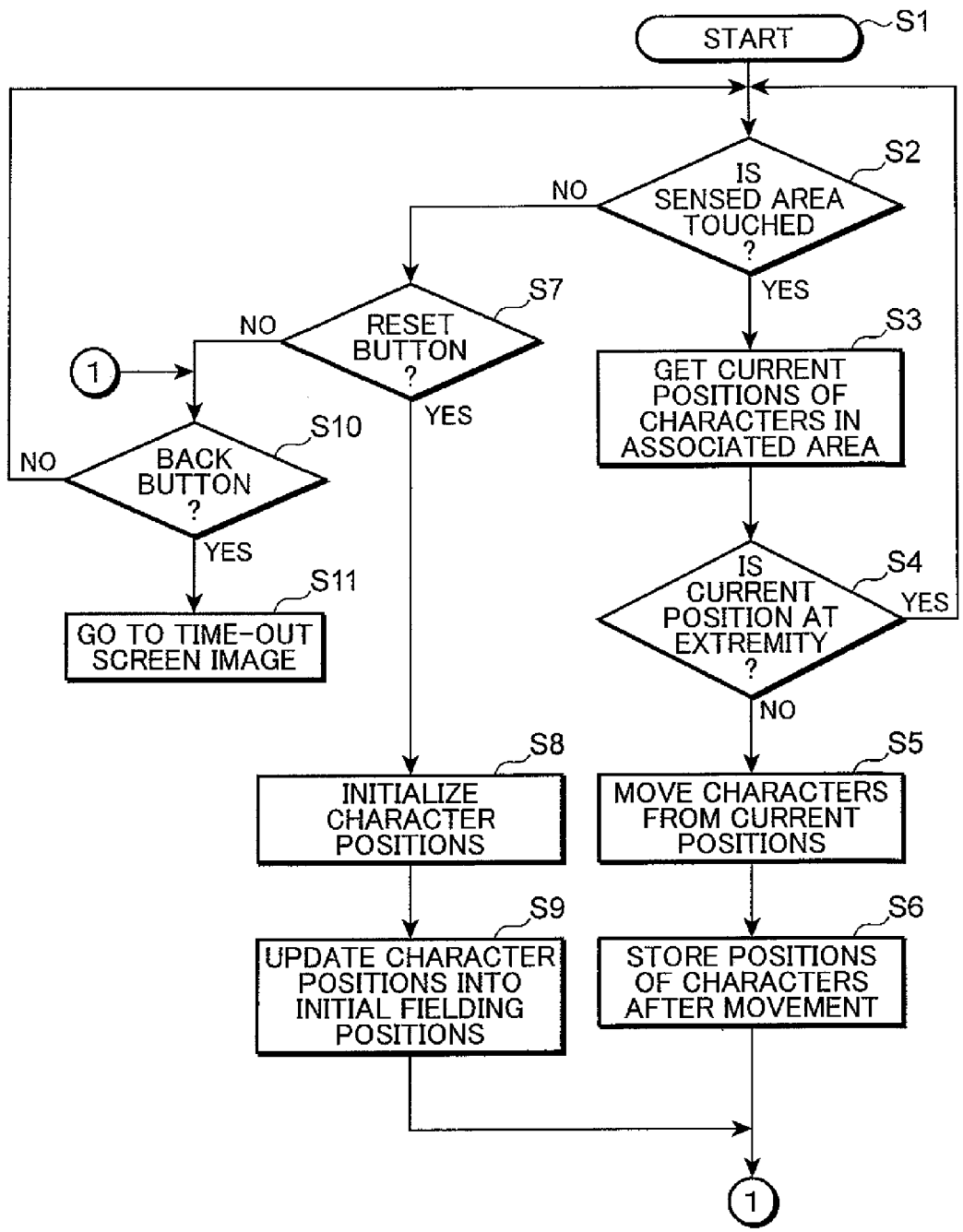
FIG. 15 is a flow chart illustrating how to shift fielding positions in the gaming device according to one embodiment of the present invention.

FIG. 15 is a flow chart illustrating how to determine fielding positions in the baseball game on the gaming device according to one embodiment of the present invention. Steps for determining the fielding positions are described below, in conjunction with the screen images shown in FIGS. 3A to 9B as well as the functional block diagram shown in FIG. 14. First, step S1 corresponds to a time point when the game screen image in FIG. 3 is shifted to the fielding positioning screen image in FIG. 5 via the time-out screen image in FIG. 4. When the player touches any one of the sensed areas A1 to A10 with his or her finger (YES in step S2), the character moving unit 307 gets the positions of the characters included in the group (one of the infielders group, the outfielders group, and the all fielders group) associated with the sensed area being touched according to the information on the game start position storing unit 308 (step S3). For example, when the player touches the sensed area A1 with his or her finger, the current positions of the outfielders C1, C2, and C3 are obtained because the sensed area A1 is associated with the outfielders group. Next, the character moving unit 307 compares the data stored on the shifted point storing unit 302 with the current positions to determine whether or not the outfielder characters have reached their respective extremity of movement (step S4). For example, the character moving unit 307 determines whether or not each of the outfielder characters C1 to C3 has reached the distal end of five scales in either line segment shown in FIGS. 12 and 13A to 13C. If this step is affirmative (YES in step S4), no character is moved in that direction and the process returns to the step to determine whether or not the player touches the sensed area (step S2). The reason why the process returns to the step S2 is that the player may attempt to move those characters in the opposite directions or move other characters (e.g., infielder characters) later. On the other hand, if the outfielder characters C1 to C3 have not yet reached the extremities (NO in step S4), the character moving unit 307 moves the characters from their current positions by the amount corresponding to a single interval depicted in FIGS. 12 and 13 (step S5). At the same time, the character moving unit 307 stores the latest positions of the characters after movement on the game start position storing unit 308 (step S6). After the step S6, the process goes to step S10 which is described later (either to return to the time-out screen image or to become ready for button input).

On the other hand, when the player is not touching any sensed area in the step S2 (NO in step S2), the process goes to a decision step to determine whether or not the player touches the reset button 204 (step S7). If the player does (YES in step S7), the reset unit 306 retrieves the information about the initial fielding positions of all characters from the initial fielding position storing unit 300 and sends this information to the character moving unit 307 to initialize the positions of all characters (step S8). Furthermore, the reset unit 306 updates the information about the positions of all characters on the game start position storing unit 308 into the information about the initial fielding positions (step S9). The step S9 proceeds to the step S10 which is described later (either to return to the time-out screen image or to become ready for the button input). When the player is not touching the reset button 204 (NO in step S7), it is determined whether the player touches the BACK button 205 (step S10). If the player touches the BACK button 205 (YES in step S10), the process goes to the time-out screen image (step S11). On the other hand, if the player is not touching the BACK button 205 (NO in step S10), the process returns to the step S2 to be ready for the button input.

[Another Positioning for Fielding Positions in Baseball Game to which the Present Invention is Applied]

Figure 16:
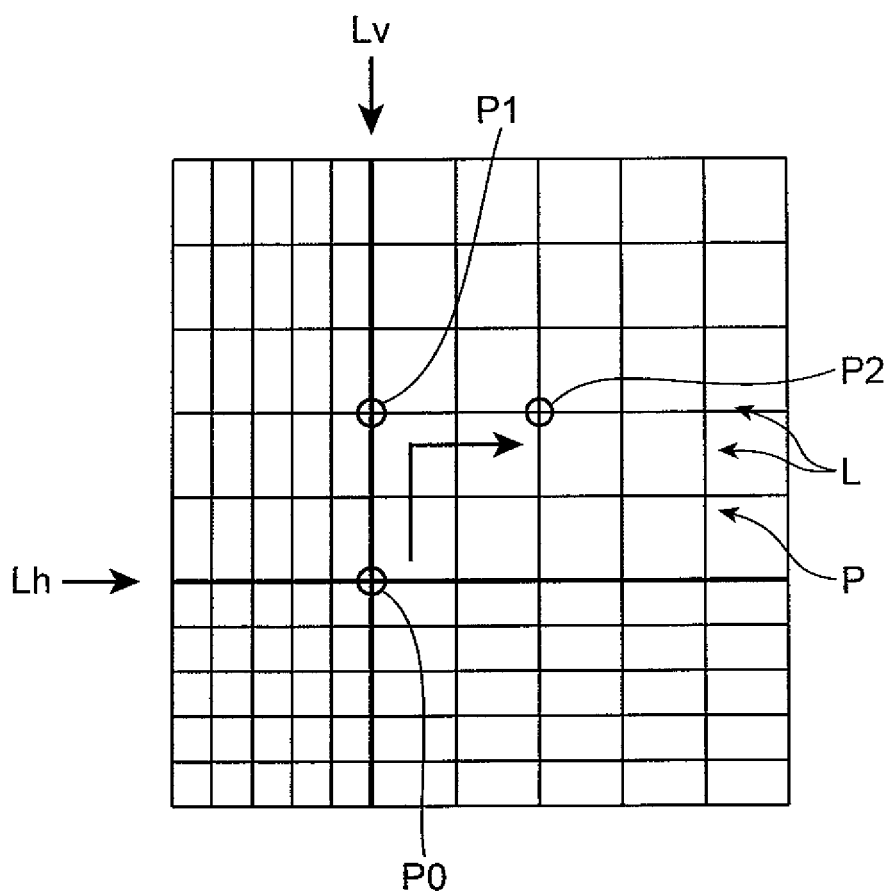
FIG. 16 is a view illustrating character positionable spans for fielder characters according to another embodiment of the present invention.

In the aforementioned embodiment, the player can move the baseball player characters in four directions (up, down, left, and right) as shown in FIGS. 12 and 13, in order to provide easier operations. However, more precise positioning may be achieved. FIG. 16 shows an example of such precise positioning. As apparent from the figure, the target points to which the character can be moved in this embodiment are located at all intersections P between horizontal and vertical line segments L. The horizontal line segments are parallel to a line segment Lh, while the vertical line segments are parallel to a line segment Lv. The line segments Lh and Lv intersects at a point P0 which corresponds to the initial fielding position. With this configuration, the player can move a character from the initial fielding position P0. For example, the player may move the character twice in the upward direction to a position P1. Then, the player may move the same character twice in the rightward direction to a position P2. Thus, it is possible for the player to move the fielder characters to any one of the intersections in FIG. 16. This allows the player to more precisely adjust the positions of the characters as compared with the case shown in FIGS. 12 and 13.

While these embodiments have described for the baseball game as an example, the present invention may be applied to other kinds of games that require change in character positions before starting or continuing a game as long as the position(s) of the character(s) can be changed. For example, the present invention can be applied to a soccer game, a volleyball game, or a basketball game.

When the present invention is applied to a soccer game, characters in a player's team may be divided into three groups, i.e., forwards, midfielders, and defenders. The present invention may be applied when the characters are moved at once, group by group.

In the aforementioned embodiments, objects are exemplified as the baseball player characters, but the present invention may be applied to various game objects other than the baseball player characters. For example, it is assumed that the objects belong to either one of predetermined groups and the initial fielding positions of the objects in the game space are previously determined. In such a case, whenever the user touches the sensed area with which one of the groups is associated, the objects contained in the group associated with that sensed area are moved in a predetermined direction by a predetermined distance, and the position may be stored on the game start position storing unit 308. The objects may be any objects that the user can move with the pointing means. Some objects may be modeled after human such as a baseball player character, and others may be modeled after animals, virtual creatures, or any other things.

In addition, in this embodiment, the characters are groped according to their roles, such as the infielder characters and the outfielder characters. However, the present invention is not limited thereto. The characters may be divided into groups according to any other criteria. For example, two or more characters (or objects) that are located closer in the virtual space may be grouped together.

In this embodiment, the positions of the characters are changed when the player touches the "FIELDING POSITION" button 113 shown in FIG. 4, and the characters are located at the latest positions. However, the present invention is not limited thereto. For example, the positions of the characters may be determined at the beginning of the game by using the aforementioned technique. Alternatively, the positions of the characters may be determined for each inning by using the aforementioned technique. In addition, the positions of the characters may be determined every time when the batter character stands in the batter's box by using the aforementioned technique. The positions of the characters may be determined every time the pitcher character pitches by using the aforementioned technique.

The technical features of the aforementioned gaming device can be summarized as follows.

(1) The gaming device according to the present invention is a gaming device on which a game is played in virtual space by bringing pointing means into contact with an image display unit that is a touch-input type display, the gaming device comprising: an initial fielding position storing unit for storing an initial fielding position of each object appearing in the game; a changeable area storing unit for storing a changeable area for each object within which the initial fielding position for the object can be renewed; a group information storing unit for storing a relationship between each of the objects and a group to which each of the objects belongs; an object moving unit for specifying, when the pointing means is brought into contact with one of sensed areas provided on the display unit, the objects in a group associated with the sensed area that is touched, according to information stored on the group information storing unit, and moving the specified objects simultaneously in a direction associated with the sensed area that is touched, by an amount corresponding to a predetermined distance; and an object position storing unit for storing the positions of the objects moved by the object moving unit.

With this configuration, the initial fielding positions of the characters can be adjusted easily before the beginning of the game, according to a strategy or preference of the player. For example, in a case of positioning of a baseball game, the initial fielding positions of the fielders can be adjusted group by group (for the infielders group, the outfielders group, the all fielders group). In addition, a mere single touch to a predetermined area on the image display unit can result in selection of the group to be moved and the direction of movement, which can be done very easily by the player. More specifically, when the player touches, with his or her finger, the sensed area (non-visible predetermined area) provided at an upper part of the outfield displayed on the image display unit, all outfielder characters are moved up (deeper) at the same time. The infielder characters are not moved this time. Touching the sensed area once moves the characters by a predetermined distance. The characters can be moved as desired, only by means of changing the number of touches. Likewise, when the player touches, with his or her finger, the sensed area provided at a lower part of the outfield, all outfielder characters are moved down (shallower) at the same time. As apparent from the above, the two sensed areas are provided within the region of the outfield. When the player touches the upper or lower part of the outfield, the outfielder characters move up or clown accordingly. This can be understood intuitively for the player, so the player can enjoy the game easily. In addition, it is not necessary for the player to directly touch the individual character with his or her finger. Thus, there is no possibility that the character is hidden by the finger. Similar operations can be done for the infielders, to change the initial fielding positions of the infielder characters. Furthermore, when the player touches an upper part of the out-of-the-field area (outside the infield and the outfield), all fielder characters are moved up (deeper). When the player touches a lower part of the out-of-the-field area, all fielder characters are moved down (shallower toward the batter). The pitcher and the catcher are not included in the infielders, and their positions are fixed.

As apparent from the above, only the fielder characters in the group that is associated with the sensed area that the player touches with his or her finger on the image display unit move at the same time in the direction associated with the sensed area by a predetermined distance. The relative location of the sensed areas (the upper sensed area, the lower sensed area, the left sensed area, and the right sensed area) corresponds the direction of movement of the characters. Thus, the player can intuitively know to which direction the characters move when he or she touches which one of the sensed areas. Moreover, it is not necessary for the player to move the characters one by one. Instead, the player can change the initial fielding positions of the characters easily and intuitively. It should be noted that a simple design provides four directions of movement for the characters on the display screen, but the character may be moved along an imaginary line connecting the character itself and the point of contact with the finger in order to achieve more precise movement of the character.

(2) It is preferable that the changeable area storing unit stores target points for each of the objects at which the initial fielding area for the object can be renewed, and the object moving unit moves the object sequentially from the initial fielding position every time the image display unit is touched with the pointing means or based on the touch executed for a predetermined period of time.

With this configuration, the shifted points (the range of movement) relative to the initial fielding position are stored for each character. Thus, the role of each character can be achieved appropriately in the game scenario. For example, for the fielding positions of a baseball game, the left fielder can be moved in a longer distance in the direction to the center fielder than in the three other directions. This is because the left fielder is expected to move much in the direction toward the center when he shifts his fielding position. Thus, the interval that the leftfielder character moves in response to a single touch to the screen by the player is larger in the direction to the center fielder (rightward) than in the other three directions. Besides, the following variations may be used. For example, the first baseman and the third baseman may be defined to be moved much in the direction closer to the batter than in the direction to the outfield (that is, on the screen, the first baseman and the third baseman can be moved in a shorter distance in the upward direction than in the downward direction). This is because the first baseman and the third baseman are required to play in or shallower as compared with the second baseman and the shortstop, when it is expected that a batter will ground the ball into fair territory such as a case when a bunt is anticipated. The aforementioned patterns are, of course, examples of the possible positioning for the characters, which is not required to be used in all cases. Various other patterns may also be used. It is noted that the initial fielding positions of the pitcher and the catcher cannot be changed (i.e., no target points associated with these characters). In addition, it is preferable that the target points are not displayed on the screen in order to keep better view (because the target points, when displayed, make the game screen image difficult to be viewed).

(3) It is preferable that the target points are defined on line segments extending from the initial fielding position in different directions, and each of the line segments has a length that is specified for each of the objects.

With this configuration, the position of the character can be changed only along the line segments passing through the initial fielding position to form a cross. The length of the four line segments extending from the initial fielding position is determined according to the role of the character. For example, when considering the example given in the aforementioned item (2), each of the right and left fielders have the longer line segment in the direction from the initial fielding position to the center fielder (center) than the remaining three line segments. As described above, by limiting the range of movement of each character only along the line segments, operation becomes easier and positioning can be made quickly and easily before the player starts the game because the character can be mobbed only in the limited directions. Furthermore, the length of the line segments extending in the four directions is defined individually according to the role of the character, so that the characters can be moved in the ranges that are expected in real baseball games, providing more realistic features of the game. In addition, the ranges of movement can be limited within appropriate regions. It should be noted that the present invention is not limited to a range of movement having the cross shape. Four or eight line segments that pass the initial fielding position may form the range of movement. In such a case, the character may be moved along one of the lines that forms the smallest angle with an imaginary line connecting the initial fielding position and the point of contact.

(4) It is preferable that each of the target points is defined at an intersection of a horizontal line segment passing through the initial fielding position and a vertical line segment that crosses the horizontal line segment at the right angle, and at intersections of plurality of line segments respectively parallel to the horizontal and vertical line segments, and each of the line segments has a length that is specified for each of the objects.

With this configuration, the characters are moved along the line segments that cross over each other, forming rectangles of a grid pattern. It should be noted that these rectangles do not always have the same shape. This is because the distance that the character moves in response to a single touch by the player may be different from character to character depending on their role(s) in the game. In such cases, the four "quadrants" along the line segments intersecting at the initial fielding position have the rectangles of different sizes from each other. In comparison with the configuration of above (3), with this configuration, the character may be moved two dimensionally along the line segments other than those forming the cross. This configuration has a significantly high degree of freedom in changing the initial fielding position and is thus useful for cases where precise positioning of the characters is required before the player starts the game.

(5) It is preferable that the game is a game simulating a baseball play, the objects include infielder characters and outfielder characters, the groups are formed of an infielders group containing the infielder characters, an outfielders group containing the outfielder characters, and an all fielders group containing the infielder characters and the outfielder characters, the pointing means is a finger of a game player, the object moving unit moves only the infielder characters at the same time when a finger of the game player touches the sensed area provided within an infield displayed on the image display unit; and moves only the outfielder characters at the same time when the finger of the game player touches the sensed area provided within an outfield displayed on the image display unit; and moreover moves the infielder characters and the outfielder characters at the same time when the finger of the game player touches the sensed area provided outside the infield and the outfield displayed on the image display unit.

With this configuration, it is possible to achieve a baseball game in which the fielding positions of the characters in the defensive team can be changed more easily and precisely.

(6) It is preferable that the changeable area for a baseman character within which the character can be moved is narrower when there is a runner character on a base that the baseman character covers than when no runner character is on.

With this configuration, when there is a runner on a base in the game, the infielder covering that base will have a narrower range of movement than normal. This is for the purpose of reflecting some situations in real baseball games (e.g., a situation where the infielders do not shift as far to reach the base as the runner does, for a chance to tag out the base runner) to the virtual game, providing more realistic game settings.

This application is based on Japanese Patent Application Serial No. 2011-008730 filed with the Japan Patent Office on Jan. 19, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A gaming device comprising:
an image display unit on which a plurality of moving objects are displayed in a virtual game space, the image display unit including a touch-input type display for allowing a game player to move a particular object or a particular group of objects, the touch-input type display having a plurality of sensed areas arranged at predetermined locations in correlation with the virtual game space to move a particular group of objects simultaneously by allowing the game player to touch a particular sensed area by pointing means;
an initial fielding position storing unit for storing an initial fielding position of each of a plurality of objects appearing in the game;
a changeable area storing unit for storing a changeable area within which the initial fielding position of each of the plurality of objects can be set;
a group information storing unit for storing a relationship between the plurality of objects and to form a group to which a certain number of objects belongs;
an object moving unit for specifying, when the pointing means is brought into contact with one of the sensed areas, the objects in a group associated with the sensed area that is touched, according to information stored on the group information storing unit, and moving the specified objects simultaneously in a direction associated with the sensed area that is touched, by an amount corresponding to a predetermined distance; and
an object position storing unit for storing positions of the objects moved by the object moving unit.

2. The gaming device as claimed in claim 1, wherein the changeable area storing unit stores a target point for each of the objects from the initial fielding position, and wherein the object moving unit moves the object sequentially from the initial fielding position every time the touch-input type display is touched with the pointing means or based on the touch executed for a predetermined period of time.

3. The gaming device as claimed in claim 2, wherein the target points are defined on line segments extending from the initial fielding position in different directions, and each of the line segments has a length that is specified for each of the objects.

4. The gaming device as claimed in claim 2, wherein each of the target points is defined at an intersection of a horizontal line segment passing through the initial fielding position and a vertical line segment that crosses the horizontal line segment at a right angle, and at intersections of a plurality of line segments respectively parallel to the horizontal and vertical line segments, and each of the line segments has a length that is specified for each of the objects.

5. The gaming device as claimed in claim 1,
wherein the game is a game simulating a baseball play,
wherein the objects include infielder characters and outfielder characters,
wherein the groups include an infielders group containing the infielder characters, an outfielders group containing the outfielder characters, and an all fielders group containing the infielder characters and the outfielder characters,
wherein the pointing means is a finger of the game player, and
wherein the object moving unit moves only the infielder characters at the same time when a finger of the game player touches the sensed area provided within an infield displayed on the image display unit, the object moving unit moves only the outfielder characters at the same time when the finger of the game player touches the sensed area provided within an outfield displayed on the image display unit, and the object moving unit moves the infielder characters and the outfielder characters at the same time when the finger of the game player touches the sensed area provided outside the infield and the outfield displayed on the image display unit.

6. The gaming device as claimed in claim 5, wherein the changeable area for a baseman character within which the baseman character can be moved is narrower when there is a runner character on a base that the baseman character covers than when no runner character is on.

7. A non-transitory computer readable recording medium on which a game control program is recorded, wherein the game control program causes a computer to function as:
input reception unit for receiving an input of a game player by way of touch-input type display having a plurality of sensed areas arranged at predetermined locations in correlation with a virtual game space in which a plurality of objects are displayed, the touch-type display being used to move a particular group of objects simultaneously by allowing the game player to touch a particular sensed area by pointing means;
an initial fielding position storing unit for storing an initial fielding position of each of a plurality of objects appearing in the game;
a changeable area storing unit for storing a changeable area within which the initial fielding position of each of the plurality of objects can be set;
a group information storing unit for storing a relationship between the plurality of objects and to form a group to which a certain number of objects belongs;
an object moving unit for specifying, when the pointing means is brought into contact with one of the sensed areas, the objects in a group associated with the sensed area that is touched, according to information stored on the group information storing unit, and moving the specified objects simultaneously in a direction associated with the sensed area that is touched, by an amount corresponding to a predetermined distance; and an object position storing unit for storing positions of the objects moved by the object moving unit.

* * * * *